(12) United States Patent
Muller-Fischer et al.

(10) Patent No.: US 8,930,969 B2
(45) Date of Patent: *Jan. 6, 2015

(54) CLOTH APPLICATION PROGRAMMER INTERFACE

(71) Applicant: NVIDIA Corporation, Santa Clara, CA (US)

(72) Inventors: Matthias Muller-Fischer, Uerikon (CH); Bruno Heidelberger, Zurich (CH)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,325

(22) Filed: Nov. 30, 2012

(65) Prior Publication Data

US 2013/0152109 A1 Jun. 13, 2013

Related U.S. Application Data

(63) Continuation of application No. 11/634,973, filed on Dec. 7, 2006, now Pat. No. 8,327,388.

(60) Provisional application No. 60/742,901, filed on Dec. 7, 2005.

(51) Int. Cl.
*G06F 9/54* (2006.01)
*G06F 17/50* (2006.01)

(52) U.S. Cl.
CPC ............ *G06F 9/541* (2013.01); *G06F 2217/32* (2013.01); *G06F 17/5009* (2013.01)
USPC .......................................... 719/328; 345/473

(58) Field of Classification Search
CPC ............... A63F 2300/6638; A63F 2300/66; A63F 2300/643; G06F 2217/32; G06F 9/541

USPC .......................................... 719/328; 345/473
See application file for complete search history.

(56) References Cited

U.S. PATENT DOCUMENTS

| | | | |
|---|---|---|---|
| 6,532,014 | B1 | 3/2003 | Xu et al. |
| 6,909,431 | B1 | 6/2005 | Anderson et al. |
| 2005/0041031 | A1 | 2/2005 | Diard |
| 2005/0080604 | A1* | 4/2005 | Ko et al. ........................ 703/6 |
| 2005/0086040 | A1 | 4/2005 | Davis et al. |
| 2006/0122819 | A1 | 6/2006 | Carmel et al. |
| 2006/0125830 | A1 | 6/2006 | Piponi |

(Continued)

OTHER PUBLICATIONS

Matyka, M.; Ollila, M., "Pressure Model of Soft Body Simulation," Proceedings of the Annual SIGRAD Conference (Nov. 20-21, 2003), pp. 29-32 [retrieved from http://citeseerx.ist.psu.edu/viewdoc/download?doi=10.1.1.146.4576&rep=rep1&type=pdf#page=37].*

(Continued)

*Primary Examiner* — Brian W Wathen
(74) *Attorney, Agent, or Firm* — Patterson & Sheridan, LLP

(57) ABSTRACT

A method of executing a physics simulation is performed in a system comprising a computational platform, a main application stored in the computational platform, a secondary application stored in the computational platform, and a cloth application programming interface (API) implemented in the computational platform. The method defines a cloth simulation call in the cloth API, and by operation of the main application, invokes a software routine using the cloth simulation call. Additionally, by operation of the secondary application, a state of the physics simulation is updated in response to the software routine.

20 Claims, 6 Drawing Sheets

(56) References Cited

U.S. PATENT DOCUMENTS

| | | |
|---|---|---|
| 2006/0200331 A1 | 9/2006 | Bordes |
| 2006/0235659 A1* | 10/2006 | Stam .................................. 703/2 |
| 2007/0030266 A1 | 2/2007 | Styles |
| 2007/0247465 A1 | 10/2007 | Hadap |
| 2008/0018650 A1 | 1/2008 | Sander |

OTHER PUBLICATIONS

Bridson, R.; Marino, S.; Fedkiw, R., "Simulation of Clothing with Folds and Wrinkles," Eurographics/SIGGRAPH Symposium on Computer Animation (2003), pp. 28-36 [retrieved from http://dl.acm.org/citation.cfm?id=846281].*

Göransson, J., "AgentPhysics: Software Design for Pluggable Real Time Physics Middleware" (Oct. 27, 2005), Master's Thesis, Department of Computer Science and Electrical Engineering, Luleå University of Technology, pp. 1-51 [retrieved from http://pure.ltu.se/portal/files/30976852/LTU-EX-05270-SE.pdf].*

Müller, M.; Heidelberger, B.; Hennix, M.; Ratcliff, J., "Position Based Dynamics" (2006), $3^{rd}$ Workshop in Virtual Reality Interactions and Physical Simulation (VRIPHYS), pp. 1-10 [retrieved from http://www.matthiasmueller.info/publications/posBasedDyn.pdf].*

Eberly, D., "Game Physics" (2004), Morgan Kaufmann Publishers, pp. 161-169 (including CD-ROM excerpt).*

Baraff, D., et al., "Large Steps in Cloth Simulation", Proceedings of the 25th annual conference on Computer graphics and X interactive techniques SIGGRAPH '98 (Jul. 19-24, 1998), CD-ROM Version, pp. 1-12 [retrieved from http://dl.acm.org/citation.cfm?id=280821 on Nov. 28, 2011].

Breen, D., et al., "A Particle-Based Model for Simulating the Draping Behavior of Woven Cloth", Textile Research Journal Nov. 1994 vol. 64 No. 11 663-685 http://citeseerx.ist.psu.edu/viewdoc/summary?doi=1 0.1.1.45.6478.

CD-ROM archive of contents of http://www.opentissue.orglwebsvnllisting.php?repname=WebTissue&path=%2Ftrunk%2Fmedia%2F& (Jan. 13, 2006) [retrieved 03/2912012].

Cotin, S., et al., "Real-time elastic deformations of soft tissues for surgery simulation," (Jan.-Mar. 1999), W IEEE Transactions on Visualization and Computer Graphics, vol. 5, No. 1, pp. 62-73, [retrieved from: http://ieeexplore.ieee.org/stamp/stamp.jsp?tp=&arnumber=764872&isnumber=16550].

Erleben, K., et al., "Physics-Based Animation" (Aug. 9, 2005), Charles River Media, Inc., pp. 265-304.

Erleben, K., et al., "OpenTissue—An Open Source Toolkit for Physics-Based Animation" (Oct. 10, 2005) pp. 1-5, retrieved from http://www.insight-journal.org/download/viewpdf/44/1 /download].

Erleben, K., et al., OpenTissue Source Code, (2003), pp. 1-231 [retrieved from W http://opentissue.org/websvn/listing.php?repname=OpenTissue&path=%2Ftrunk%2FOpenTissue%2Fdynamics%2FparticleSystem%2Fjakobsen%2F&rev=174&peg=174#a1 a1 d09868be97aOe1e4188577050a855].

Finney, K.C., "3D Game Programming All in One" (2004), Premier Press, pp. 460-463.

Grinspun, E., et al., "CHARMS: A Simple Framework for Adaptive Simulation",(2002), In Proceedings of the V 29th Annual Conference on Computer Graphics and Interactive Techniques (SIGGRAPH '02). ACM, New York, NY, USA, pp. 281-290 [retrieved from http://dl.acm.org/citation.cfm?id=566578].

Louth, A.J., "Interactive Cloth Simulation", (Sep. 2004), Department of Computing Science, University of London, pp. 1-55 [retrieved from http://www.codemedic.com/file/ICSReport.pdf on Nov. 29, 2011].

Smith, R., "Open Dynamics Engine vO.5 User Guide", (Feb. 23, 2006), pp. 1-92 [retrieved from http://ode.org/ode-latestuserguide.pdf on Nov. 28, 2011].

Telekinesys Research, Ltd., "Havok Game Dynamics SDK", (2002), pp. 1-33, retrieved from http://graphics.ethz.chlDownloads/Seminar__Arbeiten/2002__03/Havok_Overview.pdf].

Wikipedia, "Bit field" (Sep. 13, 2005), pp. 1-2 [retrieved from http://en.wikipedia.orglwfIndex.php?title=BiUield&0ldid=23190628J.

Witkin, A., et al., "Fast Animation and Control of Nonrigid Structures", (Aug. 1990), In Proceedings of the 17th annual X conference on Computer graphics and interactive techniques (SIGGRAPH '90). ACM, New York, NY, USA, pp. 243-252 [retrieved from http://dl.acm.org/citation.cfm?id=565650].

Zhang, D., et al., "Cloth Simulation Using Multilevel Meshes," (Jun. 2001) Computers & Graphics, vol. 25, Issue 3, pp. 383-389 [retrieved from http://www.sciencedirect.com/science/article/pii/S0097849301000620].

* cited by examiner

CLOTH APPLICATION PROGRAMMER INTERFACE

CROSS-REFERENCE TO RELATED APPLICATIONS

This application is a continuation of co-pending U.S. patent application Ser. No. 11/634,973, filed Dec. 7, 2006, which claims benefit of U.S. Provisional Patent Application Ser. No. 60/742,901, filed Dec. 7, 2005. Each of the aforementioned related patent applications is herein incorporated by reference.

BACKGROUND OF THE INVENTION

1. Field of the Invention

Embodiments of the invention relate generally to an application programming interface (API) for performing physics simulations. More particularly, the invention relates to an API for performing cloth simulations.

2. Description of Related Art

An Application Programming Interface (API) is a set of definitions and/or protocols used to generate computer software applications (hereafter, applications). In general, an API defines how an application communicates with other software in a computer system. For example, an API may define how an application accesses (e.g., invokes, calls, references, modifies, etc.) a set of software components (e.g., functions, procedures, variables, data structures, etc.) in the system. Alternatively, an API may also define how an application interacts with a piece of software such as an interpreter (e.g., a JavaScript Interpreter).

An API typically takes the form of a set of "calls", data structures, and variables that can be included in an application. The term "call" is used herein to denote any part of an application (e.g., an instruction, a code fragment, etc.) causing initiation, execution, retrieval, storage, indexing, update, etc. of another piece of software. In other words, including a particular call in an application generally causes the application to access a software component associated with the call. The term "data structure" should be broadly read to encompass various types of data, including single parameters and variables, as well as references, software objects, and so forth.

The term "application" is used throughout this written description to describe any piece of software that enables at least one function in a computational platform. For example, an application typically comprises a data file that enables some function by providing a set of instructions for performing the function. Applications can also be designed to have hierarchical relationships with other applications. For example, one application may control or initiate the execution of another application, or some portion thereof. In such cases, terms such as "main application" and "secondary application" may be used to describe this hierarchical relationship. However, those skilled in the art will recognize that these designations are somewhat arbitrary, e.g., as main and secondary applications may exert mutual control over each other, and also, such applications often function in the context of some greater execution hierarchy.

The terms "routine" and "subroutine" are used to denote a part of an application smaller than the whole application. Each routine or subroutine in an application may comprise one or more subroutines and/or one or more calls to other software components as previously defined in this specification.

A classic example of a call included in an application is a "function call". A function call generally comprises a name of a function and zero or more parameters or arguments for the function. When an application including the function call is executed, the function is invoked with its accompanying arguments.

The set of software components that can be accessed using a particular API is referred to as the implementation of the API. The implementation of an API may include, for example, a software library designed to run on a particular system. In general, an API is not bound to anyone particular implementation. In fact, an application may be written using a particular API so that the application may be ported to systems with different implementations of the API. For instance, an API defined by the Open Graphics Library (OpenGL) standard allows programmers to write graphics applications that run on both UNIX and Windows based platforms, even though the underlying implementation of the API is different on each platform.

In general, the implementation of one API can be constructed with calls from another API. For example, an API defining complex high-level functions can be implemented using API calls defining intermediate-level functions. The API defining intermediate-level functions can be implemented using API calls defining low-level functions, and so on.

The implementation of most APIs is distributed in one of two ways. The first way is to include the implementation as part of a computer's operating system. For example, the implementation could comprise a set of code libraries distributed with the operating system. The second way is to distribute the implementation as a separate application or as an executable or a code library that has to be linked with and/or compiled with an application.

In some cases, source code for an API's implementation is available for viewing and modification. Where an API's implementation is available in this way, the API is called "open source". In other cases, the API is only available as a set of binary files or the like, and hence, the only way to access the API is by including calls defined by the API in an application.

The term "software development kit" (SDK) is often used interchangeably with the term "API" because a SDK comprises a set of tools (e.g., an API) used to create software applications. However, a SDK generally comprises additional tools for developing applications besides an API. For instance, a software development kit may include utilities such as a debugger, or it may include special hardware tools used to communicate with embedded devices.

Most operating systems provide APIs that allow application programmers to create and/or control various system objects, such as display graphics, memory, file systems, processes, etc. In addition, operating systems may also provide APIs for performing common tasks such as multimedia processing, networking functions, and so forth.

Many independent software and/or hardware applications also provide APIs that allow application programmers to interface (e.g., control, communicate, etc.) with them. For example, an API used for communicating with a peripheral device such as a camera may define calls used to access low level software for adjusting specific aspects of the camera such as its aperture, shutter speed, exposure time, etc.

FIG. 1 is a conceptual illustration of a software architecture 100 for a system including an API. In FIG. 1, a plurality of applications 101 access a plurality of software components (API routines) 104 using an API 102. API routines 104 form a part of the implementation of API 102 and are located in an operating system or application 103.

FIG. 2 is a conceptual illustration of a conventional system 200 used to run applications containing calls from an API 205. In this written description, the term "run" describes any process in which hardware resources associated with a computational platform perform an operation under the direction (directly or indirectly) of a software resource.

Referring to FIG. 2, system 200 comprises a central processing unit (CPU) 201 operatively connected to an external memory 202. External memory 202 stores an application 203, API 205, and a plurality of API routines 206. Application 204 invokes API routines 206 using API calls 204 defined by API 205. As indicated by broken boxes in FIG. 2, application 204 and API routines 206 run on CPU 202.

Using an API to write applications is advantageous for various reasons. For example, a good API generally provides a level of abstraction between an application programmer and the low level details of the software components called by the API. An API also generally provides access to commonly used functionalities (e.g., creating display graphics, formatting text, spawning processes) so that application programmers do not have to implement these functionalities from scratch. Moreover, since an API is not bound to a particular implementation, APIs generally allow applications to be ported between different systems. In addition, APIs provide standard representations for various programming tasks, which allows different programmers to work on an application without having to relearn all the calls contained therein.

Because of the various advantages provided by APIs, most specialized application areas in the field of computer science/engineering have associated APIs. The calls provided by an API serve as building blocks for creating applications of increasing complexity within the application area. For example, in computer graphics, low level APIs such as OpenGL and DirectX define functions for rendering primitive graphics components such as polygons and other shapes. Graphics programmers such as video game programmers then build upon the functions defined by the low level APIs to create higher level APIs defining functions for performing higher level tasks such as complex character animations. Accordingly, developing effective APIs increases the scope of what can be produced by application programmers within an application area.

An emerging application area where APIs are still in the primitive stages of development is the area of computational physics simulations. Computational physics simulations are used for a variety of purposes, ranging from scientific visualization to three dimensional (3D) game animation.

The goal of computational physics simulations is to model interactions between objects in a virtual world using the laws of physics. For example, in the case of scientific visualization, the physical forces and interactions between the elements of a polypeptide chain may be computationally modeled and observed in order to predict the conformation (e.g., folding) of a particular protein. In the case of 3D game animation, the physical forces and interactions between actors (e.g., characters, objects, substances, etc.) in a scene and their environment is modeled in order to generate lifelike animations of the scene. Simulations of forces such as gravity, pressure, friction, chemical forces, etc. can be combined to create lifelike animations of collisions, falling objects, explosions, and so forth.

Formally defined, a "physics simulation" is a virtual representation of a physical entity or entities that changes over time in accordance with the laws of physics. For example, FIG. 3 illustrates a physics simulation wherein a "world state" 301 is periodically updated according to a step function 302 to yield an "updated world state" 303. World state 301 typically includes a set of objects having a number of associated physical attributes such as a size, shape, mass, location, velocity, acceleration, density, etc. World state 301 also typically includes a set of forces acting on each of the objects. The forces may include, for example, gravity, pressure, friction, magnetic attraction/repulsion, etc. In step function 302, the objects are allowed to evolve, i.e., change physical attributes, for a predetermined time step in accordance with their associated velocities, forces, etc. A resulting new set of physical attributes and forces constitute updated world state 303. Step function can then be repeated to generate further world states from updated world state 303.

An example of a conventional API designed to execute physics simulations is Havok Physics 3 (HP3). HP3 defines routines for performing collision detection, dynamics and constraint solving, and vehicle dynamics in a physics simulation.

One interesting problem that currently available APIs fail to adequately address is the problem of simulating cloth using physics. An example of a method for simulating cloth is provided in commonly assigned U.S. patent application Ser. No. 11/358,407 (the '407 Application), the disclosure of which is incorporated by reference.

In general, a piece of cloth can be simulated by representing the cloth as a collection of primitive elements such as particles, geometric forms such as polygons, or nodes or vertices in a mesh. Each primitive element typically has an associated set of physical attributes such as size, mass, velocity, location, and a set of forces acting on it. In addition, the primitive elements typically have constrained interrelationships. For example, the locations of primitive elements representing adjacent units of a simulated piece of cloth may be correlated under a set of constraints to represent cloth properties such as topology or interconnectedness, stretchiness, rigidity, and so on. Furthermore, attributes related to the appearance of a piece of cloth, such as texture and other material properties, can also be simulated for display purposes.

FIG. 4 illustrates one example of how a cloth simulation may be performed. Referring to FIG. 4, a set of physical attributes and forces associated with a simulated piece of cloth can be said to constitute a cloth state 401. A step function 402 acts on the cloth for a predetermined time step so that the cloth evolves in accordance with velocities, forces, and other constraints associated with each primitive element constituting the cloth. Accordingly, an updated cloth state 403 is generated after the predetermined time step.

In most practical scenarios, the cloth simulation is coupled to an output for displaying or evaluating properties of the simulated cloth. For example, in FIG. 4, updated cloth state 403 is transformed into an image 405 by a display function 404. In general, display function 404 performs a mapping between a three dimensional representation of the cloth and a two dimensional representation. A variety of methods could be used to perform display function 404. For example, projective transformations, ray trace algorithms, hidden surface removal functions, and a wide variety of other rendering techniques could be used to form image 405.

By providing an effective API, cloth simulations can be more readily introduced into contemporary applications such as cutting edge interactive video games. An effective API would give application programmers access to complicated functions, data structures, and definitions required to perform cloth simulations with minimal additional programming overhead.

SUMMARY OF THE INVENTION

Embodiments of the invention recognize the need for an API allowing programmers to incorporate realistic cloth simulations into their applications. The invention further recognizes the need for a system adapted to efficiently run applications written with the API.

According to one embodiment of the invention, a method is provided for executing a physics simulation in a system comprising a computational platform, a main application stored in the computational platform, a secondary application stored in the computational platform, and a cloth application programming interface (API) implemented in the computational platform. The method comprises defining a cloth simulation call in the cloth API, by operation of the main application, invoking a software routine using the cloth simulation call, and by operation of the secondary application, updating a state of the physics simulation in response to the software routine.

According to another embodiment of the invention, a system is provided for executing a physics simulation. The system comprises a computational platform comprising at least one central processing unit and memory, a main application stored in the computational platform, a secondary application stored in the computational platform, a cloth application programming interface (API) implemented in the computational platform, and a cloth simulation call defined by the cloth API and included in the main application so as to invoke a software routine for updating a state of the physics simulation by operation of the secondary application.

BRIEF DESCRIPTION OF THE DRAWINGS

The invention is described below in relation to several embodiments illustrated in the accompanying drawings. These embodiments are provided as teaching examples, and the scope of the invention is defined by the attached claims. Throughout the drawings, like reference numbers indicate like exemplary elements, components, or steps. In the drawings:

FIGURE (FIG.) 1 is a conceptual illustration of a software architecture for a system including an API.

DESCRIPTION OF EXEMPLARY EMBODIMENTS

Embodiments of the invention recognize the need for an API allowing computer application programmers to incorporate realistic cloth simulations into their applications. Embodiments of the invention further recognize the need for a system adapted to efficiently run applications written with the API.

Embodiments of the invention find ready application in various application areas requiring lifelike cloth simulations, including, but not limited to application areas where the cloth simulations are computed in real-time. Exemplary application areas include, for example, computer games, scientific applications, and multimedia presentations such as computer animated films.

Figure 5:
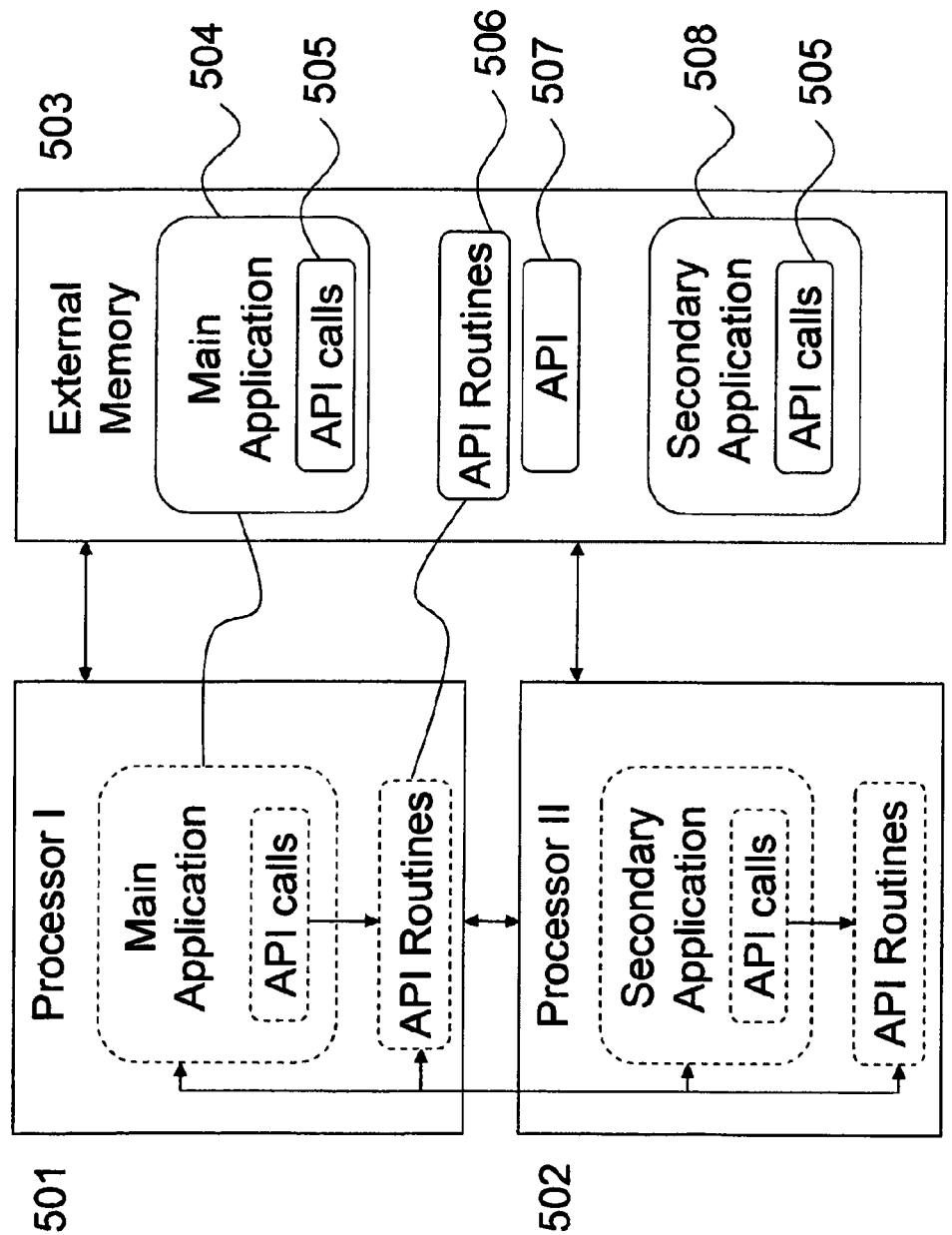
FIG. 5 shows a system adapted to run an application containing calls from a physics API in accordance with one embodiment of the present invention; and, FIG. 6 is a flowchart illustrating a method of executing a physics simulation in accordance with one embodiment of the present invention.

FIG. 5 shows a system adapted to execute a physics simulation according to one embodiment of the invention.

Referring to FIG. 5, the system comprises a computational platform including a first processor 501 and a second processor 502 operatively connected to each other and to an external memory 503. The term "computational platform" used herein refers broadly to any combination of computational hardware and memory used to process and store data. The term "processor" refers to a part of the computational platform (e.g., a logic circuit) used to process the data.

In one embodiment of the invention, first and second processors 501 and 502 comprise respective first and second CPUs operatively connected by a system bus. Accordingly, the first and second CPUs are generally located on a single printed circuit board (PCB).

In another embodiment of the invention, first and second processors 501 and 502 comprise a CPU and a co-processor operatively connected via a peripheral component interconnect (PCI) interface.

In yet another embodiment of the invention, first and second processors 501 and 502 comprise respective first and second cores of a dual core multiprocessor. In other words, first and second processors 501 and 502 are located on a single integrated circuit (IC) chip.

Although FIG. 5 shows two processors, the system could also comprise a single processor having at least two execution threads for executing multiple processes or applications in parallel.

The system of FIG. 5 further comprises a main application 504 and a secondary application 508 stored in an external memory 503. The system still further comprises an API 507 defining a set of API calls 505 used for invoking a corresponding set of API routines 506.

Main application 504 typically runs substantially on first processor 501 and secondary application 508 typically runs substantially on second processor 502. Main application 504 and secondary application 508 typically run in parallel and use asynchronous signaling to communicate with each other.

Figure 1:
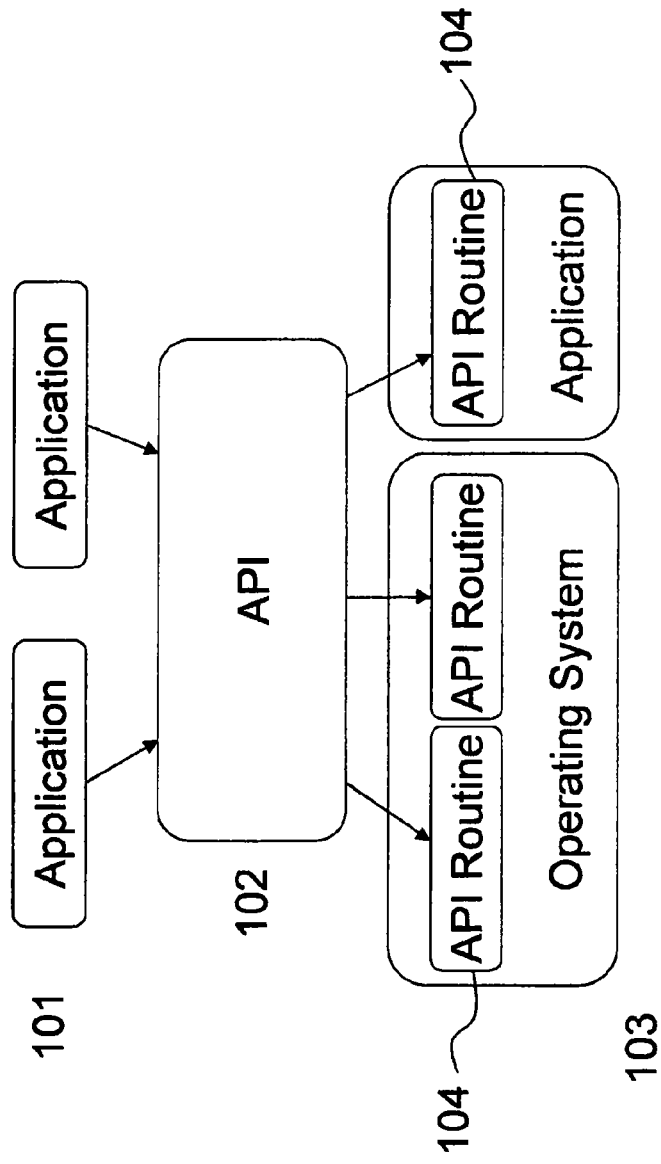
Figure 2:
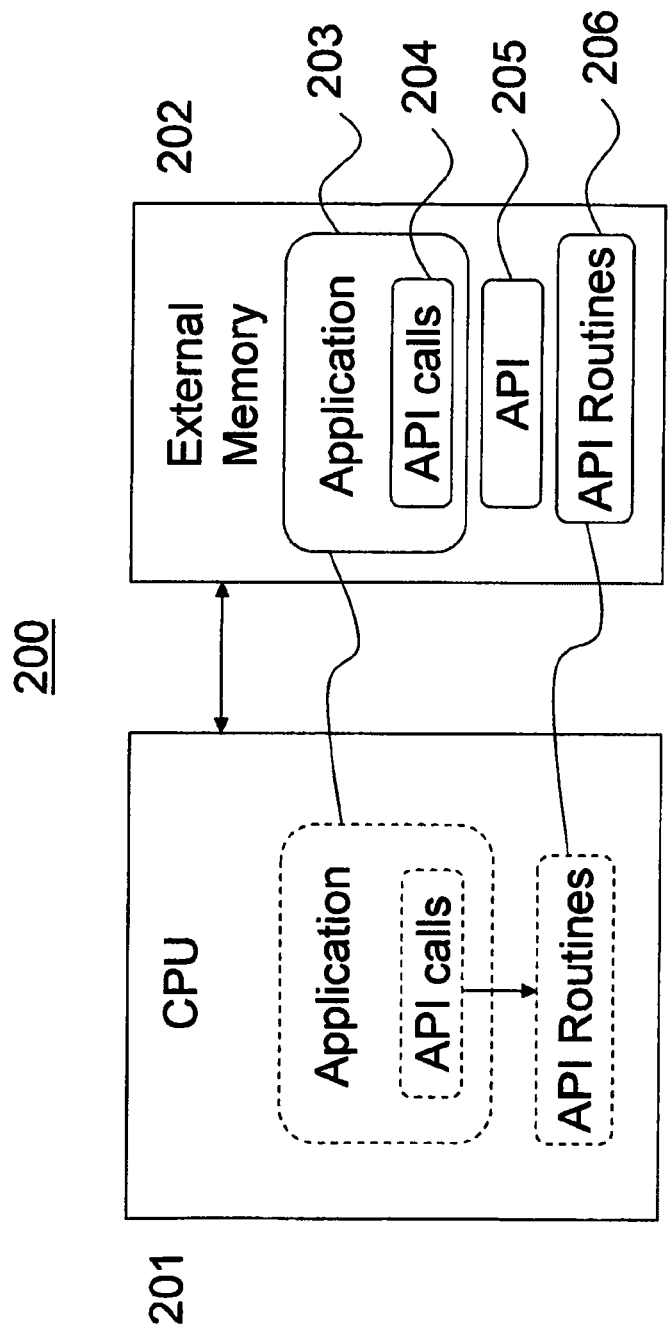
FIG. 2 shows a conventional system adapted to run an application containing calls from a particular API.
Figure 3:
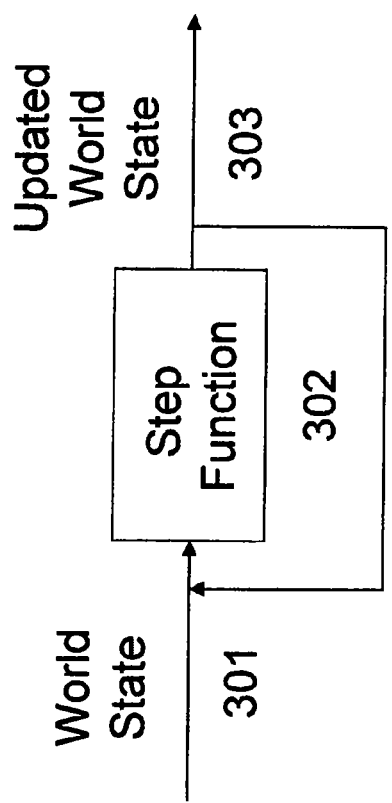
FIG. 3 is an illustration of one example of a physics simulation.
Figure 4:
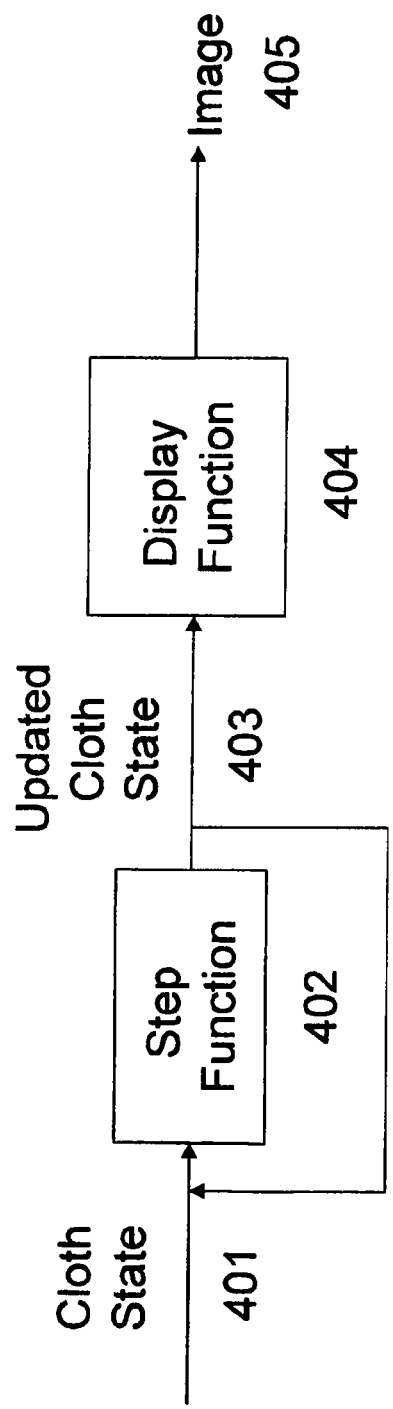
FIG. 4 is an illustration of one example of a cloth simulation.

For example, in one embodiment of the invention, main application 504 comprises a game program (i.e., a video game) and secondary application 508 comprises a physics simulation of a virtual environment (i.e., a world state) of the game program. The game program typically spawns or initiates the physics simulation, including any necessary initialization. Thereafter, the physics simulation runs in parallel with the game program, updating the world state according to a predetermined time step as illustrated in FIG. 3. Whenever the world state is updated, the physics simulation sends a signal to the game program indicating a change in various physical attributes of the game program's virtual environment. Similarly, the game program also sends signals to the physics simulation whenever various actors in the game program interact with their environment in a way that might affect the physics simulation.

At least one of main application 504 or secondary application 505 contains one of API calls 505. API calls included in main application 504 may cause API routines 506 to run on first processor 501 or on second processor 502. Likewise, API calls included in secondary application 508 may cause API routines 506 to run on first processor 501 or second processor 502.

API routines 506 are typically distributed as part of an operating system of the computational platform. However, API routines 506 may also be distributed as an independent application or a set of independent executables or code libraries that have to be linked and/or compiled with main application 504 and/or secondary application 508.

According to one embodiment of the invention, API calls 505 are defined by a cloth API. In particular, the cloth API defines calls for creating objects in a cloth simulation and simulating dynamic properties of the objects over time.

Cloth is typically represented in a cloth simulation as a set of vertices comprising a mesh, where each vertex is characterized by a position in three dimensional (3D) virtual space, a velocity, and a mass. The position of each vertex can be governed by a corresponding set of constraints such that when the dynamic object is simulated, the position of each vertex is updated in accordance with the constraints. Examples of such constraints include distance constraints between vertices, positional constraints for individual vertices or groups of vertices, collision constraints, attachment constraints, linear momentum constraints, and attachments, to name but a few. Since a vertex's velocity is related to its change in position, each vertex's velocity is generally updated along with its position.

To provide the above representation of cloth, the cloth API provides calls for creating cloth objects. A cloth object is typically created through a call to a constructor of a software object class NxCloth, which defines various attributes of the cloth object. The cloth object here is a software abstraction encompassing a number of associated data structures such as variables and other objects, as well as a collection of member functions. In the description that follows, it will be assumed that the cloth object is simulated in the context of a "rigid body scene". In other words, the simulation allows the cloth object to interact with a collection of rigid virtual objects. Although a "rigid body scene" and rigid bodies or objects are described for explanation purposes, it should be recognized that the rigid objects can be substituted by different types of objects such as dynamic objects, deformable objects, and so on.

The data for the cloth object generally includes a mesh or a reference to a mesh used to represent the cloth and a variety of parameters associated with the mesh. The mesh typically comprises a software object with a data type NxClothMesh that includes a plurality of 3D points, or "nodes", together with associated interconnections. For example, the nodes are typically connected to form triangles or polygons. In addition to the mesh, the data for the cloth object typically further comprises a texture used for rendering purposes, and a thickness.

The data for the cloth object also includes parameters used to characterize the way the cloth responds to physical forces and interacts with its environment. Examples of these parameters include an attachment response coefficient corresponding to an amount of impulse transfer between cloth and attached rigid bodies when either the cloth object or the rigid bodies collide with other objects, a bending stiffness corresponding to the relative ease with which the cloth can deform by bending, a collision response coefficient corresponding to the amount of energy restored to the cloth object after a collision with another object, and a damping coefficient corresponding to an adjustment performed on the velocities of individual nodes of the cloth object based on factors such as a desired amount of correlation between the local velocities of the nodes and a global velocity of the cloth object.

Other examples of these parameters include a friction coefficient corresponding to the way the cloth responds to contact with the surfaces of other objects, a stretching stiffness corresponding to the ease with which the cloth object can be stretched, and a tear factor representing how easily the cloth can be torn. In addition, certain types of cloth objects may be characterized by additional parameters such as a pressure coefficient. For example, a closed cloth object such as a "cloth balloon" typically has an associated pressure that can affect the shape of the cloth object and the way it deforms when coming in contact with other objects in a simulation.

The data for the cloth object still further includes a set of enumerated values used to determine how the cloth object is simulated. For example, one set of enumerated values includes flags (enum NxClothFlag) determining whether certain parameters are used, and another set of enumerated values includes interaction modes (enum NxClothInteractionMode) determining how the object interacts with other objects in collisions, and cloth mesh targets for "cooking" (enum NxClothMeshTarget). Still another set of enumerated values includes attachment flags (enum NxClothAttachmentFlag) determining whether and/or how a cloth object is attached to a rigid object and how such a cloth object and the attached rigid object may interact. Each of the above types of enumerated values will be described in further detail below.

The following are exemplary flags used to determine how a cloth simulation is performed. For example, several of the flags determine what physical forces are modeled and how they are modeled, whether and how collision detection is handled, and so on.

A flag NX_CLF_PRESSURE is used to enable and disable the simulation of pressure for the cloth object. In general, the simulation of pressure tends to produce meaningful results only for closed meshes such as the cloth balloons mentioned above. Where the flag NX_CLF_PRESSURE is set, the volume of air or other fluid inside the closed mesh can be computed by the equation volume=pressure*restVolume, where restVolume represents a predetermined resting volume of the closed mesh.

A flag NX_CLF_STATIC makes the cloth object static. In other words, where this flag is set, the cloth object is not simulated. For example, during a cloth simulation where the cloth object disappears from view, the flag NX_CLF_STATIC may be set so that the cloth object will not consume any processing bandwidth while out of view. An application can reactivate simulation of the cloth object by clearing the flag NX_CLF_STATIC. Similar to a static cloth object, a sleeping cloth object is not simulated. However, a sleeping cloth object generally consumes at least a small amount of processing bandwidth to check whether the sleeping cloth object has to wake up, for example, in response to a collision with another object. An example of a "sleeping" cloth object may be a cloth object that is in view but is in a resting position such that it is unnecessary to constantly simulate forces acting on the sleeping cloth object.

A flag NX_CLF_DISABLE_COLLISION enables and disables the handling of collisions between the cloth object and rigid bodies in the rigid body scene. Where the collision handling is disabled, cloth objects freely move through rigid bodies, for example. One practical example where cloth collision may be disabled for a particular cloth object is where the application programmer knows that the particular cloth object will never collide with any rigid bodies. In general, disabling collision handling reduces the number of processing steps that are performed in a simulation and therefore it tends to speed the simulation up.

A flag NX_CLF_SELFCOLLISION enables and disables collision detection and handling between different pieces of cloth and within a single piece of cloth. Where collision between different pieces of cloth or between a piece of cloth and itself is disabled, cloth may move through cloth. However, as a practical matter, the handling of these types of collisions will generally be disabled only when such collisions are unlikely to occur.

A flag NX_CLF_GRAVITY enables and disables the simulation of gravity. Where the flag NX_CLF_GRAVITY is not set, the cloth object is not subject to a simulated gravitational force.

A flag NX_CLF_BENDING enables and disables bending resistance represented by the bending stiffness parameter discussed above. Where the flag NX_CLF_BENDING is set, there are two possible bending modes that can be used, based on another flag, NX_CLF_BENDING_ORTHO, which enables and disables orthogonal bending resistance. Where the flag NX_CLF_BENDING_ORTHO is not set, bending is modeled via a distance constraint. Modeling the bending of the cloth object via the distance constraint is fast, but it cannot be performed independent of stretching resistance. Where the flag NX_CLF_BENDING_ORTHO is set, bending is modeled via an angular spring between adjacent triangles. Modeling the bending of the cloth object via the angular spring is relatively slow, but it can be performed independent of stretching resistance.

A flag NX_CLF_DAMPING enables and disables damping of internal velocities of the cloth object. The term "internal velocities" here refers to the velocities of individual nodes of the cloth object relative to the global motion of the cloth object. The magnitude of the damping is regulated by the damping coefficient mentioned above. As an example, if the internal velocities are not damped at all, then the velocity of each node can be computed independent of the overall global velocity of the cloth object. On the other hand, if the internal velocities are completely damped, then the internal velocities will be completely correlated with the global velocity of the cloth object, for example, as in a rigid body. It should be noted that where this type of damping occurs, it does not alter the global velocity of the cloth object, e.g., by slowing it down in free flight. Instead, the damping merely slows down internal motions of individual nodes relative to the global velocity.

A flag NX_CLF_COLLISION_TWOWAY enables and disables two way collisions between the cloth object and rigid bodies. The cloth object can still be influenced by collisions with rigid bodies even when the flag NX_$_{CLF}$_COLLISION_TWOWAY is not set. However, where the flag NX_CLF_COLLISION_TWOWAY is not set, rigid bodies are not influenced by collisions with the cloth object. On the other hand, where the flag NX_CLF_COLLISION_TWOWAY is set, both the cloth object and rigid bodies are influenced by collisions with each other. The collision response coefficient mentioned above controls the strength of feedback forces between the rigid bodies and the cloth object. For example, increasing the value of the collision response coefficient increases the amount of momentum that is transferred between the cloth object and the rigid bodies during a collision.

A flag NX_CLF_TRIANGLE_COLLISION enables and disables collision detection between cloth triangles forming the cloth object and rigid bodies in the rigid body scene. For example, where the flag NX_CLF_TRIANGLE_COLLISION is not set, collisions are detected only between nodes of the mesh representing the cloth mesh and rigid bodies. However, where the flag NX_CLF_TRIANGLE_COLLISION is set, collisions between cloth triangles in the cloth object are detected as well.

A flag NX_CLF_TEARABLE is used to determine whether or not the cloth object is allowed to be torn. Tearing the cloth object will tend to increase the number of vertices in the mesh representing the cloth object. Accordingly, the flag NX_CLF_TEARABLE is generally only set where the number of vertices in the mesh representing the cloth object is substantially less than a maximum allowable number of mesh vertices.

Exemplary attachment flags of type enum NxClothAttachmentFlag will now be described. As a first example, a flag NX_CLOTH_ATTACHMENT_TWOWAY can be set so that a cloth object and a rigid body attached to each other both exert physical influence on the other. Where the flag NX_CLOTH_ATTACHMENT_TWOWAY is not set, the rigid body attached to the cloth object will exert physical influence on the cloth object but the cloth object will not exert physical influence on the rigid body. As a second example, a flag NX_CLOTH_ATTACHMENT_TEARABLE can be set to allow a cloth object attached to a rigid object to be torn while still attached to the rigid body. For example, where the flag NX_CLOTH_ATTACHMENT_TEARABLE is set, the cloth object may be torn in two pieces, one of which remains attached to the rigid body and another of which does not.

Exemplary interaction modes for the cloth object will now be described. In general, the interaction modes limit the type of interactions that can take place between the cloth object and other objects in the rigid body scene.

For example, an interaction mode NX_CLOTH_INTERACTION_ONEWAY limits interactions between the cloth object and rigid bodies so that when the cloth object collides with a rigid body, the motion of the cloth object is affected, but the motion of the rigid body is not.

On the other hand, an interaction mode NX_CLOTH_INTERACTION_TWOWAY limits interactions between the cloth object and rigid bodies so that collisions between the cloth object and a rigid body will affect the motion of both the cloth object and the rigid body.

Exemplary enumerated values corresponding to mesh targets for "cooking" include the target NX_CLOTH_MESH_SOFTWARE and the target NX_CLOTH_MESH_FPU_ATHENA. The term "cooking" here refers to preprocessing steps performed on data prior to a simulation. For instance, to simulate a cloth object represented by a triangular mesh, the stretching and bending constraints for the cloth can be generated based on the geometry of the triangles. These constraints can then be added to a data file storing data for the mesh. The generation and storage of these constraints constitute part of the process of "cooking" the cloth object.

The exemplary targets NX_CLOTH_MESH_SOFTWARE and NX_CLOTH_MESH_FPU_ATHENA are used to determine the type of cooking that is performed on the cloth object based on whether the simulation will be performed predominantly by software, or by specialized hardware. For instance, where the target NX_CLOTH_MESH_SOFTWARE is set, the cloth object is preprocessed, i.e., cooked, so that it can be simulated in software. On the other hand, where the target NX_CLOTH_MESH_ATHENA is set, the cloth object is preprocessed, i.e., cooked, so that it can be simulated in specialized hardware. As one example of a special cooking technique used where the cloth object is simulated in hardware, cloth objects simulated in hardware are typically divided into patches that can be processed in parallel using a distinct hardware processing unit for each patch.

In addition to the above data, the API also provides the cloth object with a set of function calls (i.e., for calling member functions of the class NxCloth) that can be accessed by application programmers. In general, many of the function calls allow an application programmer to attach the cloth object to various other objects such as rigid bodies. Still other function calls provide application programmers with access to many of the above described data parameters. A variety of these function calls will be described below by way of illustration.

For example, a function call "attachToCollidingShapes" may attach the cloth object to all shapes that are currently colliding with the cloth object. This function call receives a cloth interaction mode parameter such as NX_CLOTH_INTERACTION_ONEWAY or NX_CLOTH_INTERACTION_TWOWAY and uses this parameter to determine whether the attached cloth object will affect the movement of the objects to which it attaches.

A function call "attachToShape" attaches the cloth object to one specific shape or object in the rigid body scene. The shape or a pointer to the shape is typically input as a parameter to the function call, together with a cloth interaction mode parameter such as NX_CLOTH_INTERACTION_ONEWAY or NX_CLOTH_INTERACTION_TWOWAY used to determine whether the attached cloth object will affect the movement of the shape. Generally, all points that are within the shape when the function call is invoked will be attached to the shape.

Conversely, a function call "detachFromShape" detaches the cloth object from a shape to which it has previously been attached. Where the cloth object has not been previously attached to the shape, the call has no effect. The function call receives as parameters a shape or a pointer to a shape from which the cloth should be detached.

A function call "attachVertexToGlobalPosition" attaches a vertex within the cloth object to a position in world space. The function typically receives as parameters an identifier for the vertex, and the position in world space to which the vertex will be attached. One illustration of a use for this function call would be, for example, to attach a banner to a wall.

A function call "attachVertexToShape" attaches a vertex within the cloth object to a shape or object in the rigid body scene. The function typically receives as parameters an identifier for the vertex, a position of the vertex relative to the pose of the shape, and a cloth interaction mode parameter such as NX_CLOTH_INTERACTION_ONEWAY or NX_CLOTH_INTERACTION_TWOWAY used to determine whether the attached cloth object will affect the movement of the shape. One illustration of a use for this function call would be, for example, to attach a bandana to a stick.

Conversely, a function call "freeVertex" frees a vertex of a cloth object that has been previously attached to a shape, object, or position. This function receives as a parameter an identifier for the vertex.

The following function calls serve mainly for retrieving data associated with the cloth object. In general, most of these "retrieval" functions do not require any input parameters. For example, a function call "getAttachmentResponseCoefficient" retrieves the attachment response coefficient of the cloth object. A function call "getBendingStiffness" retrieves the cloth bending stiffness. A function call "getClothMesh" returns a pointer to a cloth mesh corresponding to the cloth object. A function call Virtual "getCollisionResponseCoefficient" retrieves the collision response coefficient for the cloth object. A function call "getDampingCoefficient" retrieves the damping coefficient for the cloth object. The function call "getFlags" retrieves flags associated with the cloth object. A function call "getFriction" retrieves the friction coefficient for the cloth object cloth. A function call "getGroup" retrieves a "collision group" to which the cloth object belongs. The collision group generally includes a set of objects that are jointly affected by collisions. A function call "getMeshData" returns a copy of a user buffer wrapper for the cloth mesh. A function call virtual "getPressure" retrieves the cloth pressure coefficient for the cloth object. A function call "getSolverIterations" retrieves a number of cloth solver iterations used to simulate the cloth object (See, the '407 Application). A function call "getStretchingStiffness" retrieves the stretching stiffness of the cloth object. A function call "getTearFactor" retrieves the tear factor of the cloth object. Finally, a function call "getThickness" retrieves the thickness of the cloth object.

Another function call, "raycast", is used to execute a ray cast against the cloth object. This function call typically receives as parameters a reference to a ray, a reference to a position of a closest vertex of the cloth object that is hit by the ray, and a reference to an identifier of the closest vertex.

A function call "saveToDesc" saves a descriptor corresponding to the cloth object. This function call typically receives as a parameter a reference to a descriptor used to retrieve a state of the cloth object.

The following function calls are used to set the values of various data parameters associated with the cloth object. In general, these function calls receive as parameters the values to be set.

For example, a function call "setAttachmentResponseCoefficient" sets an attachment response coefficient for the cloth object. The value of the attachment response coefficient is typically a real number between zero and one. A function call "setBendingStiffness" sets the cloth bending stiffness of the cloth object in the range between zero and one. A function call "setCollisionResponseCoefficient" sets the collision response coefficient of the cloth object in a range from zero to one. A function call "setDampingCoefficient" sets the damping coefficient of the cloth object in a range between zero and one. A function call "setFlags" sets flags for the cloth object based on a combination of bits defined by the flags enumerated value. A function call "setFriction" sets the cloth friction coefficient in the range between zero and one. A function call "setGroup" assigns the cloth object to a particular collision group. A function call "setMeshData" sets a user buffer wrapper for a cloth mesh corresponding to the cloth object. A function call "setPressure" sets the cloth pressure coefficient of the cloth object. A function call "setSolverIterations" retrieves the number of cloth solver iterations used to simulate the cloth object. A function call "setStretchingStiffness" sets the cloth stretching stiffness of the cloth object in a range between zero and one. A function call "setTearFactor" sets the cloth tear factor of the cloth object. A function call "setThickness" sets the thickness of the cloth object.

The API also provides data structures and functions for implementing a cloth descriptor. The cloth descriptor typically comprises data structures, parameters and/or function implementations used to characterize at least part of a cloth object. In other words, the cloth object may be characterized in relation to a particular cloth descriptor specifying the cloth object's attributes or structuring the attributes in a particular data structure. One exemplary use of the cloth descriptor is to provide parameters to create or initialize a cloth object. For instance, a cloth descriptor or a reference to a cloth descriptor could be passed to a function call for creating a cloth object so that the function call is not required to receive a large number of input parameters. In addition, the descriptor typically includes a function IsValid, which returns an indication that the descriptor includes valid parameters for a simulation.

Because the cloth descriptor provides data structures and parameters for characterizing or initializing a cloth object, the cloth descriptor may include many of the same or analogous data structures and/or functions as a cloth object. For example, the cloth descriptor may contain implementations of pure virtual functions defined in the cloth class NxCloth. The cloth descriptor is typically created through a call to a constructor of a software object class NxClothDesc, which defines various attributes of the cloth descriptor.

Like the cloth object, the cloth descriptor is also a software abstraction encompassing a number of associated data structures such as variables and other objects, and one or more member functions. In the description that follows, it will be assumed that the cloth descriptor corresponds to a cloth object simulated in the context of a "rigid body scene".

The data for the cloth descriptor typically includes an attachment response coefficient, a bending stiffness, a cooked cloth mesh, a collision group, a collision response coefficient, a damping coefficient, a cloth density (i.e., mass per area), cloth descriptor flags, a friction coefficient, a global pose of the cloth in the world, mesh data for representing cloth, a pressure coefficient, a number of solver iterations to use in simulation, a stretching stiffness, a tear factor, a thickness, and so on. Many of these data can be modified through corresponding functions described above in relation to the software object class NxCloth.

The API also provides function calls and data for creating and manipulating a cloth mesh such as that referenced by cloth objects. Typically, the cloth mesh comprises a software object with the data type NxClothMesh.

As described above, the data of a cloth mesh typically includes a plurality of 3D points, or "nodes", together with associated interconnections. The cloth mesh generally loads the mesh from an appropriate data stream using a call to a member function "load," which receives as a parameter a reference to the data stream. Other function calls for the cloth mesh include "getReferenceCount," which returns a number of cloth object instances that reference the cloth mesh, and "saveToDesc," which saves a descriptor corresponding to the cloth object. The function call "saveToDesc" typically receives as a parameter a reference to a descriptor used to retrieve a state of the cloth object.

The API also provides data structures and one or more member functions for a cloth mesh descriptor. The cloth mesh descriptor typically comprises a software object with the data type NxClothMeshDesc. The cloth mesh descriptor object is typically derived from a software object NxSimpleTriangleMesh containing functions and data for describing and manipulating a mesh. The cloth mesh descriptor typically includes a data value "target" defining how any created mesh is cooked. By default, the value "target" is set to NX_CLOTH_MESH_SOFTWARE, indicating that the mesh is pre-processed, or cooked, to be simulated in software. Similar to the cloth descriptor, the cloth mesh descriptor can be used, for example, to initialize a cloth mesh when the cloth mesh is created. Additionally, the cloth mesh descriptor may implement various pure virtual functions which may be included as member functions in a cloth mesh object.

The systems described above in relation to FIGS. 1 through 5 are just a few examples of systems that could execute physics simulations using a cloth API. Other systems adapted to execute physics simulations using a cloth API are disclosed, for example, in U.S. patent applications with Ser. Nos. 10/715,459 and 10/715,440 filed Nov. 19, 2003, Ser. No. 10/815,721 filed Apr. 2, 2004, Ser. No. 10/839,155 filed May 6, 2004, Ser. No. 10/982,791 filed Nov. 8, 2004, and Ser. No. 10/988,588 filed Nov. 16, 2004.

Figure 6:
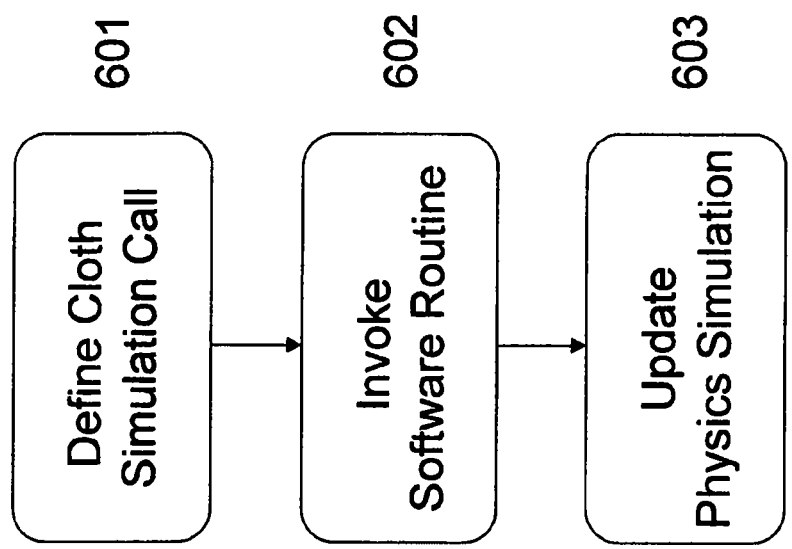

FIG. 6 is a flowchart illustrating a method of executing a physics simulation in a system such as those described above. In the description of FIG. 6, parentheses (XXX) are used to indicate exemplary method steps.

Referring to FIG. 6, the physics simulation is executed by defining a cloth-related call in the cloth API (601). Then, by operation of the main application, a software routine is invoked using the cloth-related call (602). For example, the cloth-related call may be included in the main application so that when the main application executes, the cloth-related call causes a corresponding software routine to execute. Then, by operation of the secondary application, the physics simulation is updated in response to the software routine (603). For example, the software routine could add or delete an emitter or update various properties of particles in a fluid simulation using any of various cloth-related API calls described above.

The foregoing exemplary embodiments of the invention are presented as teaching examples. Those of ordinary skill in the art will understand that various changes in form and details may be made to these embodiments without departing from the scope of the invention as defined by the claims that follow.

What is claimed:

1. A method of executing a physics simulation in a computational platform, the method comprising:

executing a cloth simulation call defined in an application programming interface (API) implemented in the computational platform to invoke a software routine that is configured to create a cloth object in a cloth simulation, wherein the cloth object has simulated behavior that is characterized in relation to one or more interaction modes, wherein a first interaction mode of the one or more interaction modes is used to enable or disable two way interactions between the cloth object and one or more simulated attached rigid bodies, wherein the first interaction mode is associated with a function that attaches the cloth object to all simulated attached rigid bodies of the one or more simulated attached rigid bodies with which the cloth object is currently colliding; and updating state information associated with the physics simulation in response to the invoked software routine.

2. The method of claim 1, wherein the simulated behavior is characterized in relation to one or more flags.

3. The method of claim 2, wherein the one or more flags are used to enable or disable simulation of pressure in the cloth object.

4. The method of claim 1, wherein the cloth object is associated with a cloth mesh object.

5. The method of claim 4, wherein the cloth mesh object defines a triangular mesh.

6. The method of claim 1, wherein the cloth object has simulated behavior that is characterized in relation to an attachment response coefficient, a bending stiffness, a collision response coefficient, a damping coefficient, a friction coefficient, a stretching stiffness, a tear factor, or a pressure coefficient.

7. The method of claim 1, wherein the simulated behavior is characterized in relation to one or more flags used to enable or disable bending resistance in the cloth object.

8. A non-transitory computer readable medium containing instructions, that, when executed by a system comprising a computational platform, cause the system to execute a method comprising:

executing a cloth simulation call defined in an application programming interface (API) to invoke a software routine that is configured to create a cloth object in a cloth simulation, wherein the cloth object has simulated behavior that is characterized in relation to one or more interaction modes, wherein a first interaction mode of the one or more interaction modes is used to enable or disable two way interactions between the cloth object and one or more simulated attached rigid bodies, wherein the first interaction mode is associated with a function that attaches the cloth object to all simulated attached rigid bodies of the one or more simulated attached rigid bodies with which the cloth object is currently colliding; and updating state information associated with the physics simulation in response to the invoked software routine.

9. The non-transitory computer readable medium of claim 8, wherein the simulated behavior is characterized in relation to one or more flags.

10. The non-transitory computer readable medium of claim 9, wherein the one or more flags are used to enable or disable simulation of pressure in the cloth object.

11. The non-transitory computer readable medium of claim 8, wherein the cloth object is associated with a cloth mesh object.

12. The non-transitory computer readable medium of claim 11, wherein the cloth mesh object defines a triangular mesh.

13. The non-transitory computer readable medium of claim 8, wherein the cloth object has simulated behavior that is characterized in relation to an attachment response coefficient, a bending stiffness, a collision response coefficient, a damping coefficient, a friction coefficient, a stretching stiffness, a tear factor, or a pressure coefficient.

14. A system adapted to execute a physics simulation, the system comprising:

a computational platform comprising at least one central processing unit and memory; and a cloth application programming interface (API) implemented in the computational platform, wherein the cloth API defines a cloth simulation call that is executed to invoke a software routine for updating a state of the physics simulation, wherein the software routine is configured to create a cloth object in a cloth simulation, and wherein the cloth object has simulated behavior that is characterized in relation to one or more interaction modes, wherein a first interaction mode of the one or more interaction modes is used to enable or disable two way interactions between the cloth object and one or more simulated attached rigid bodies, wherein the first interaction mode is associated with a function that attaches the cloth object to all simulated attached rigid bodies of the one or more simulated attached rigid bodies with which the cloth object is currently colliding.

15. The system of claim 14, wherein the simulated behavior is characterized in relation to one or more flags.

16. The system of claim 15, wherein the one or more flags are used to enable or disable simulation of pressure in the cloth object.

17. The system of claim 14, wherein the cloth object is associated with a cloth mesh object.

18. The system of claim 17, wherein the cloth mesh object defines a triangular mesh.

19. The system of claim 14, wherein the cloth object has simulated behavior that is characterized in relation to an attachment response coefficient, a bending stiffness, a collision response coefficient, a damping coefficient, a friction coefficient, a stretching stiffness, a tear factor, or a pressure coefficient.

20. The system of claim 14, wherein the simulated behavior is characterized in relation to one or more flags used to enable or disable bending resistance in the cloth object.

* * * * *